(12) United States Patent
Von Elm

(10) Patent No.: US 11,598,953 B2
(45) Date of Patent: Mar. 7, 2023

(54) DEVICES FOR THERMALLY ACTUATING DEFORMABLE MIRROR, AND ASSOCIATED MANUFACTURING METHODS

(71) Applicant: Coherent LaserSystems GmbH & Co. KG, Göttingen (DE)

(72) Inventor: Rüdiger Von Elm, Wielen (DE)

(73) Assignee: Coherent LaserSystems GmbH & Co. KG, Göttingen (DE)

(*) Notice: Subject to any disclaimer, the term of this patent is extended or adjusted under 35 U.S.C. 154(b) by 194 days.

(21) Appl. No.: 17/101,783

(22) Filed: Nov. 23, 2020

(65) Prior Publication Data

US 2022/0163795 A1    May 26, 2022

(51) Int. Cl.
| | |
|---|---|
| *G02B 27/00* | (2006.01) |
| *F03G 7/06* | (2006.01) |
| *G02B 7/182* | (2021.01) |
| *G02B 26/08* | (2006.01) |

(52) U.S. Cl.
CPC ......... *G02B 27/0068* (2013.01); *F03G 7/06* (2013.01); *G02B 7/182* (2013.01); *G02B 26/0825* (2013.01)

(58) Field of Classification Search
CPC ............. G02B 27/0068; G02B 7/182; G02B 26/0825; G02B 26/06; G02B 26/0866; G02B 7/1815; F03G 7/06
USPC ........................................................ 359/872
See application file for complete search history.

(56) References Cited

U.S. PATENT DOCUMENTS

| | | | |
|---|---|---|---|
| 5,986,795 A | 12/1999 | Chapman et al. | |
| 6,877,316 B1 * | 4/2005 | Sarkar ................... | B81B 3/0024 60/527 |
| 6,880,942 B2 * | 4/2005 | Hazelton ............. | G03F 7/70266 359/849 |

FOREIGN PATENT DOCUMENTS

| | | | | |
|---|---|---|---|---|
| DE | 102011086665 A1 | 5/2013 | | |
| WO | WO-2021018499 A1 * | 2/2021 | ......... | G03F 7/70266 |

OTHER PUBLICATIONS

J. Everson, J. Greenough; Proc. SPIE 0179, Adaptive Optical components II, Jul. 11, 1979 (Year: 1979).*
International Search Report and Written Opinion received for International Patent Application No. PCT/EP2021/080475 dated Feb. 8, 2022, 13 pages.

(Continued)

*Primary Examiner* — Stephone B Allen
*Assistant Examiner* — Rahman Abdur
(74) *Attorney, Agent, or Firm* — Morrison & Foerster LLP

(57) ABSTRACT

A device for thermally actuating a deformable mirror includes a monolithic block that includes a mirror plate having a front face forming or configured to support a mirror, a base, and a one-dimensional array of thermally expandable actuators. The thermally expandable actuators mechanically connect a rear face of the mirror plate to the base such that shape, tilt, and/or location of the front face depend on temperature of the thermally expandable actuators. The mirror plate, base, and thermally expandable actuators are defined by slits that span between opposite-facing top and bottom surfaces of the monolithic block. The monolithic block may be made of a metal and may be manufactured at relatively low cost by wire eroding the slits in a metal block, using a wire that passes through the metal block between its top and bottom surfaces.

22 Claims, 11 Drawing Sheets

(56) References Cited

OTHER PUBLICATIONS

Ravensbergen et al., (2013). "Deformable mirrors with thermo-mechanical actuators for extreme ultraviolet lithography: Design, realization and validation," Precision Engineering, 37(2):353-363.
Vdovin et al., (2002). "Ultralow-cost deformable mirror based on thermal expansion," Proceedings of SPIE, 5036:460-464.
Huang et al., (2015). "Experimental investigation of the deformable mirror with bidirectional thermal actuators," Optics Express, 23(13):17520-17530.
Ravensbergen, (2012). "Thesis: Adaptive optics for extreme ultra-violet lithography: actuator design and validation for deformable mirror concepts," 100 pages.
Vdovin et al., (2002). "Deformable mirror with thermal actuators," Optics Letters, 27(9):677-679.

\* cited by examiner

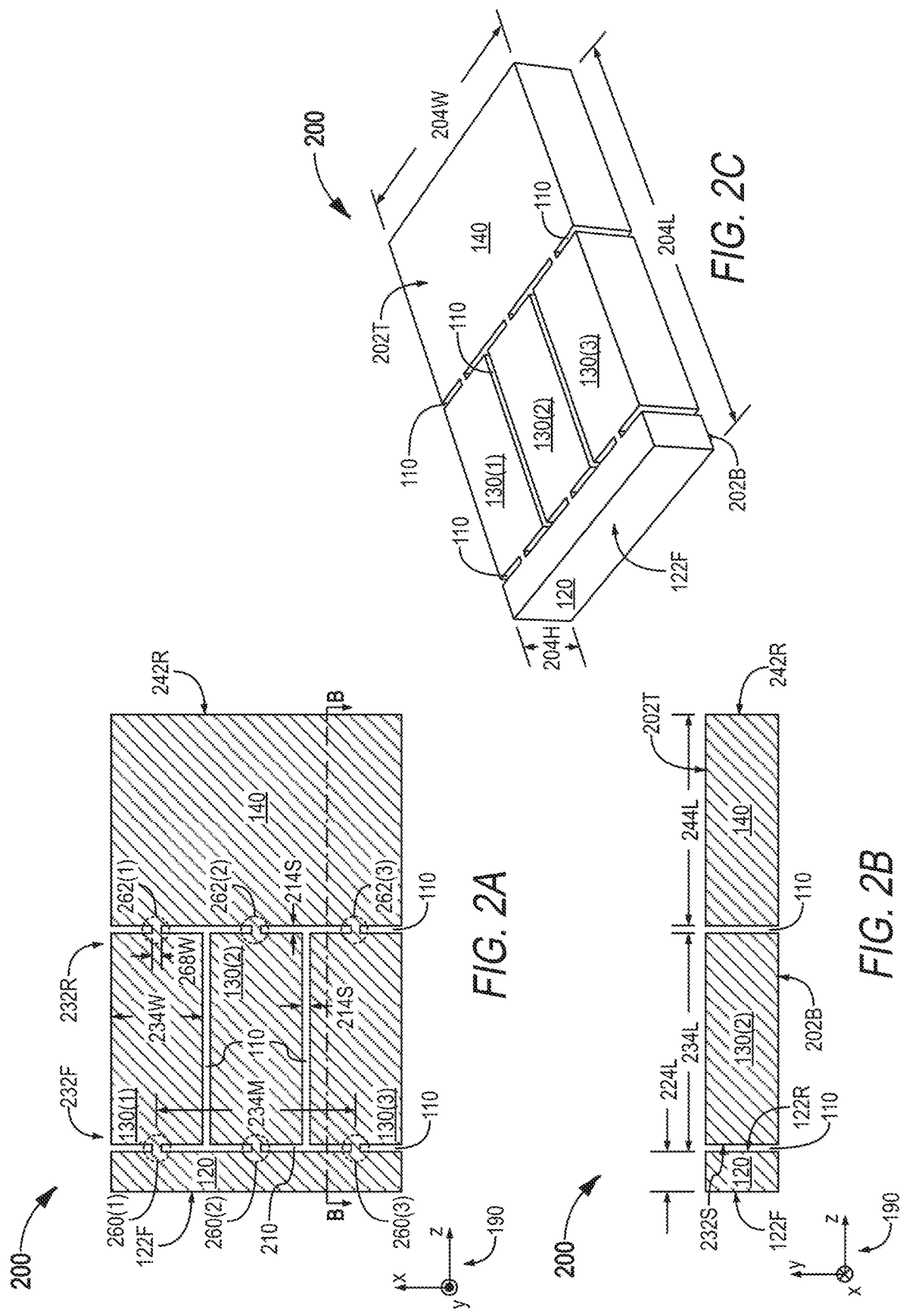

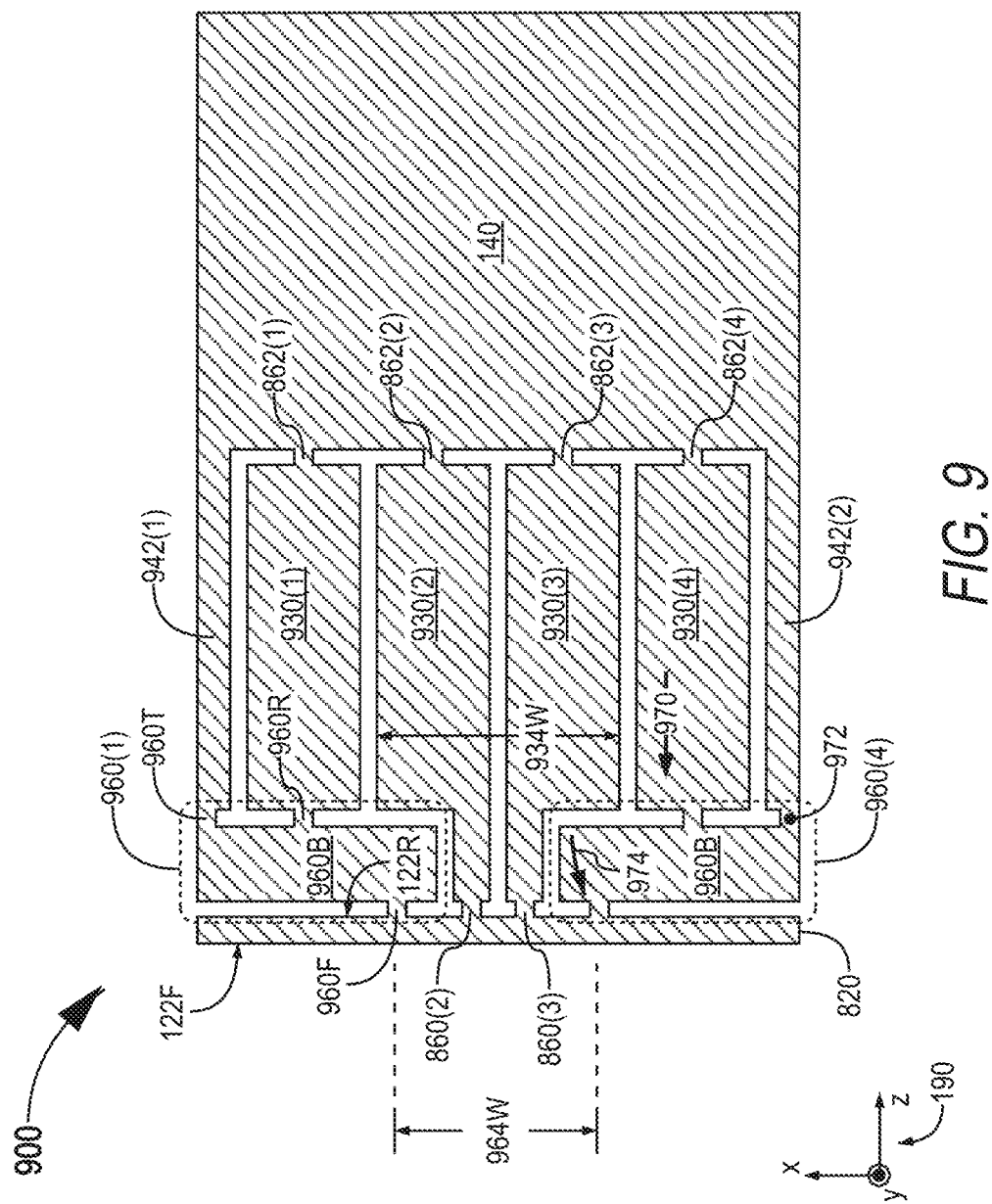

DEVICES FOR THERMALLY ACTUATING DEFORMABLE MIRROR, AND ASSOCIATED MANUFACTURING METHODS

TECHNICAL FIELD OF THE INVENTION

The present invention relates in general to adaptive optics, in particular to thermally actuated adaptive mirrors.

DISCUSSION OF BACKGROUND ART

Adaptive optics systems are used to manipulate the wavefront of a light field. Adaptive optics systems include one or more adaptive optical elements that can be adjusted to change the wavefront of a light field. For example, a deformable mirror may be deformed to impart a desired wavefront change on the reflected light. Similarly, a deformable lens may be deformed to impart a desired wavefront change on the transmitted light. Although open-loop operation is sufficient in some scenarios, adaptive optics systems typically incorporate an active-feedback loop wherein one or more adaptive optical elements are adjusted repeatedly according to measurements of the resulting wavefront.

Adaptive optics systems were originally developed to correct for wavefront distortion caused by atmospheric turbulence, and many of the world's largest telescopes are equipped with adaptive optics to remove such wavefront distortion. Since their initial development, adaptive optics systems have found other uses. Adaptive optics systems are used to correct for time-varying wavefront distortion caused by imperfections in optical systems and/or environmental factors. Adaptive optics systems are also used to achieve wavefront properties that cannot, even under ideal circumstance, be achieved with conventional optical elements. Currently, adaptive optics systems are employed in a diverse range of technology fields including microscopy, retinal imaging, shaping of femtosecond laser pulses, optical communication, and astronomical imaging.

Deformable mirrors may be continuous or segmented. In a segmented deformable mirror, the mirror surface consists of separate segments. Each such mirror-surface segment is non-deformable but with individual actuation of each mirror-surface segment, the overall mirror surface is deformable. In a continuous deformable mirror, the mirror surface is continuous and has some degree of flexibility. An actuator array is positioned between the backside of the continuous mirror surface and a support substrate, to enable deformation of the continuous mirror surface. Continuous deformable mirrors with actuators that travel up to a few microns are commercially available.

Microelectromechanical systems (MEMS) technology has been used to manufacture continuous deformable mirrors. Such MEMS-based continuous deformable mirrors are typically assemblies of many separate parts, including an array of separate actuator structures that are controlled electrostatically or magnetically. In another category of continuous deformable mirrors, a piezoelectric wafer is attached to the backside of the mirror surface, and an array of electrodes controls local thicknesses of the piezoelectric wafer. Both MEMS-based and piezoelectric-wafer-based continuous deformable mirrors, designed for laser-beam wavefront correction, are now commercially available. These commercially available devices have a high number of actuators, typically tens of actuators or even more, arranged in a two-dimensional array to offer general-purpose and high-resolution wavefront control.

Nonlinear crystals are routinely used to frequency-doubling, frequency-tripling, and otherwise frequency convert, to achieve laser light at a desired frequency. This is particularly true in the case of ultraviolet (UV) laser systems. Since high-power, reliable laser sources are available in the near-infrared range, frequency-conversion of near-infrared laser light to reach the UV range is generally more effective than direct generation of UV laser light.

SUMMARY OF THE INVENTION

We have realized that deformable mirrors may be used to resolve common wavefront correction problems in laser systems, such as wavefront distortions caused by nonlinear crystals. However, currently, the typical price of a commercially available deformable mirror is between four and twenty thousand dollars or more. For large-scale implementation of deformable mirrors in commercial laser systems to be an attractive solution, the deformable mirrors must be manufacturable at lower cost than those commercially available at this time. Disclosed herein are devices for thermally actuating a deformable mirror. These devices are manufacturable at a fraction of the cost of the current MEMS-based and piezoelectric-based devices, and are therefore suitable for large-scale implementation in commercial laser systems.

The presently disclosed devices originate in our realization that a monolithic actuator-block with a one-dimensional actuator array may be manufactured by wire erosion. Wire erosion is a relatively low-cost manufacturing method, and the monolithic nature of the actuator-block minimizes assembly steps needed to produce a fully functional deformable mirror. Scenarios that require full two-dimensional wavefront manipulation may utilize two orthogonally oriented deformable mirrors, each based on the present monolithic actuator-block. The monolithic actuator-block is made of a thermally expandable material, such that the length of individual actuators in the monolithic actuator-block may be controlled with heating elements affixed to the actuators. While thermal actuation cannot reach the same rate of change as electrostatic, magnetic, or piezoelectric actuators, the speed of thermal actuation is sufficient for many practical applications, such as compensation for light-induced degradation of a nonlinear crystal or thermal drift. In addition, unlike the most common piezoelectric materials, the present monolithic actuator-block and heating elements may be lead-free.

In one aspect, a device for thermally actuating a deformable mirror includes a monolithic block. The monolithic block includes (a) a mirror plate having a front face forming or configured to support a mirror, (b) a base, and (c) a one-dimensional array of thermally expandable actuators mechanically connecting a rear face of the mirror plate to the base such that at least one of shape, tilt, and location of the front face depends on temperature of the thermally expandable actuators. The mirror plate, base, and thermally expandable actuators are defined by slits spanning between opposite-facing top and bottom surfaces of the monolithic block.

In another aspect, a method for manufacturing a thermally actuated deformable mirror device, includes a step of wire eroding slits in a monolithic metal block to form (a) a mirror plate having a front face forming or configured to support a mirror, (b) a base, and (c) a one-dimensional array of thermally expandable actuators connecting the base to a rear face of the mirror plate such that at least one of shape, tilt, and position of the front face depends on temperature of the thermally expandable actuators. The wire eroding step is performed with a wire passing through the monolithic metal block between opposite-facing top and bottom surfaces thereof.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIGS. 2A-C illustrate a three-actuator monolithic block for thermally actuating a deformable mirror, according to an embodiment.

FIG. 9 illustrates a four-actuator monolithic block with leverage-enhanced outer actuation, according to an embodiment.

DETAILED DESCRIPTION OF THE INVENTION

Figure 1:
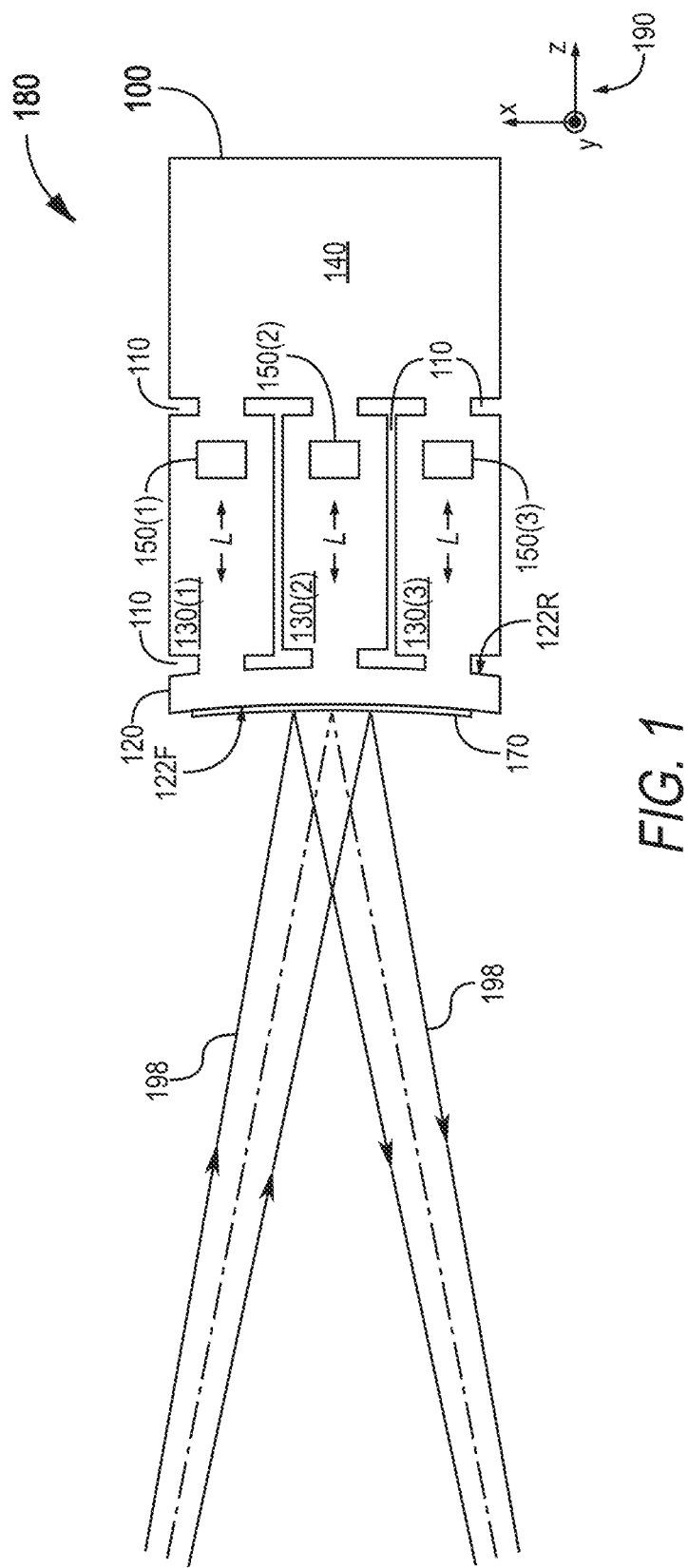
FIG. 1 illustrates a device for thermally actuating a deformable mirror, according to an embodiment.

Referring now to the drawings, wherein like components are designated by like numerals, FIG. 1 illustrates, in top plan view, one device 180 for thermally actuating a deformable mirror 170. Device 180 includes a monolithic block 100 that includes a mirror plate 120, a base 140, and a one-dimensional (1D) array of actuators 130. Mirror plate 120, base 140, and actuators 130 are defined by slits 110 spanning between opposite-facing top and bottom surfaces of monolithic block 100. The top and bottom surfaces of monolithic block 100 are parallel to the xz-plane of a cartesian coordinate system 190, with the top surface of monolithic block 100 facing out of the page of FIG. 1 and the bottom surface of monolithic block 100 facing into the page of FIG. 1 (and therefore hidden from view). Slits 110 span the full height of monolithic block 100 along the y-axis of coordinate system 190 between the top and bottom surfaces of monolithic block 100. The 1D array of actuators 130 is distributed along the z-axis coordinate system 190. Mirror plate 120 has a front face 122F that forms or supports mirror 170. The 1D array of actuators mechanically connects a rear face 122R of mirror plate 120 to base 140.

Monolithic block 100 is made of a thermally expandable material. As a result, each actuator 130 is thermally expandable. In particular, when the temperature of a given actuator 130 increases, its length L along the z-axis increases. Thus, depending on the design of actuators 130, the shape, tilt, and/or location of front face 122F, in the xz-plane, depends on the temperature of actuators 130. Base 140 serves as an anchor to fix device 180 in an optical system. Base 140 may also function as a heat sink that helps reduce thermal crosstalk between actuators 130.

In embodiments of device 180 where front face 122F is configured to support mirror 170, device 180 may include mirror 170. Device 180 may also include one or more heating elements 150 to control the temperature of actuators 130. In one example, each actuator 130 is equipped with at least one heating element 150, such that every actuator 130 is an active actuator.

Device 180 may be provided with or without mirror 170. In one scenario, device 180 is provided as monolithic block 100 without mirror 170, for example such that a customer can select mirror 170 according to specific customer needs.

While FIG. 1 depicts an example of monolithic block 100 having three actuators 130, the 1D actuator array may include more than three actuators 130, without departing from the scope hereof. In addition, one or more actuators 130 may share a mechanical connection to mirror plate 120, as opposed to having separate connections thereto as shown in FIG. 1.

FIG. 1 shows device 180 in an example scenario, utilizing an embodiment of monolithic block 100 having three actuators 130(1), 130(2), and 130(3). In this scenario, the outer actuators 130(1) and 130(3) are heated to be longer than the central actuator 130(2), such that mirror 170 takes the shape of a concave cylindrical mirror that focuses a slightly diverging laser beam 198 incident thereon. In an alternative scenario, central actuator 130(2) is heated to be longer than outer actuators 130(1) and 130(3), such that mirror 170 takes the shape of a convex cylindrical mirror. It is also possible to tilt mirror 170 in the xz-plan, for example by heating actuator 130(1) to a higher temperature than actuator 130(3). In addition, mirror 170 may be translated along the z-axis by uniformly increasing (or decreasing) the temperature of all actuators 130.

FIGS. 2A-2C illustrate one three-actuator monolithic block 200, in a state where the temperature of monolithic block 200 is uniform. FIG. 2A is a top plan view of monolithic block 200, FIG. 2B is a cross-sectional side view of monolithic block 200 taken along line B-B in FIG. 2A, and FIG. 2C is a perspective view of monolithic block 200. Monolithic block 200 is an embodiment of monolithic block 100 configured with three actuators 130.

For each actuator 130, monolithic block 200 includes (a) a front connector 260 that mechanically connects a front end 232F of actuator 130 to rear face 122R and (b) at least one rear connector 262 that mechanically connects a rear end 232R of actuator 130 to base 140. Front connectors 260 and rear connectors 262 are defined by slits 110 and span between top surface 202T and bottom surface 202B of monolithic block 200. Each front connector 260 has a thermal impedance to heat flow between mirror plate 120 and the associated front end 232F. Each rear connector 262 presents a thermal impedance to heat flow between base 140 and the associated rear end 232R. Each actuator 130 presents a thermal impedance to heat flow between front end 232F and rear end 232R. In an embodiment, the thermal impedance of each front connector 260 as well as the thermal impedance of each rear connector 262 exceed the thermal impedance of each actuator 130, so as to achieve at least some degree of thermal isolation of each actuator 130. In one example of this embodiment, the width 268W of front connectors 260 and rear connectors 262 is significantly smaller than the width 234W of actuators 130. For example, width 268W may be less than 10% of width 234W. In one implementation, width 268W is between 0.2 and 0.5 millimeters, while width 234W is at least 4 millimeters. Width 268W of one front connector 260 or rear connector 262 may be different from width 268W of other ones of front connectors 260 or rear connectors 262. Likewise, one or more of actuators 130 may have a different width 234W than the remaining actuator(s) 130 of the 1D actuator array.

Each front connector 260 connects rear face 122R to a front-facing surface 232S of a respective actuator 130. Without departing from the scope hereof, front connectors 260 and/or rear connectors 262 may have more complex shapes, in the xz-plane, than depicted in FIGS. 2A and 2C. In one such example, the width of one or more of front connectors 260 and rear connectors 262 is non-uniform. In another such example, the path traversed by one or more of front connectors 260 and rear connectors 262 in the xz-plane has one or more bends instead of being strictly parallel to the z-axis as shown in FIGS. 2A and 2C. In such examples, thermal isolation of actuators 130 may be achieved by the transverse extent, in the xz-dimensions and orthogonal to the traversed path, of at least a portion of each front connector 260 and rear connector 262 being sufficiently small to provide the desired degree of thermal isolation.

In addition to providing thermal isolation, a small width 268W of front connectors 260 and rear connectors 262 allows for some flex between actuators 130 and mirror plate 120, thereby allowing deformation and/or tilt of mirror plate 120 in the xz-plane. In one embodiment, width 168W being significantly smaller than the height 204H of monolithic block 200 along the y-axis, such that front connectors 260 and rear connectors 262 have lower flexural stiffness in directions parallel to the xz-plane than in directions non-parallel thereto. In this embodiment, deformation and movement of mirror plate 120 is mostly restricted to dimensions parallel to the xz-plane, even in the event that the temperature of one or more actuators 130 is non-uniform along the y-axis. This property relaxes the requirements for positioning heating elements 150. For example, each heating element 150 may be affixed to top surface 202T without causing mirror plate 120 to bend downward in the negative y-axis direction upon heating of one or more actuators 130.

Monolithic block 200 may be made of metal. The type of metal, especially its thermal conductivity and coefficient of thermal expansion, affect the performance of actuation by monolithic block 200. A high thermal conductivity enables relatively rapid actuation of mirror plate 120 by actuators 130. On the other hand, a high thermal conductivity also increases thermal crosstalk between different actuators 130 because, primarily, of the correspondingly lower thermal impedance of front connectors 260 and rear connectors 262. Increased thermal crosstalk between actuators 130 may be associated with a reduction in the maximum possible length difference between different actuators 130. In one embodiment, monolithic block 200 is made of a metal with a thermal conductivity that is less than 30 W/(m·K), in order to achieve good thermal isolation between different actuators 130. This embodiment of monolithic block 200 is, for example, made of austenitic stainless steel. In another embodiment, monolithic block 200 is made of a metal with a thermal conductivity that is greater than 200 W/(m·K), to enable more rapid actuation by monolithic block 200. This embodiment of monolithic block 200 is, for example, made of an aluminum alloy.

All slits 110 span between top surface 202T and bottom surface 202B such that (a) the slit pattern is the same in any cross section of monolithic block 200 parallel to the xz-plane and (b) all surfaces of monolithic block 200 facing a slit 110 are orthogonal to top surface 202T and bottom surface 202B. In the example depicted in FIGS. 2A-C, some parts of slits 110 run parallel to the x-axis, and others run parallel to the z-axis. Without departing from the scope hereof, slits 110 may include portions that are at an oblique angle to the x- and z-axes.

Figure 13:
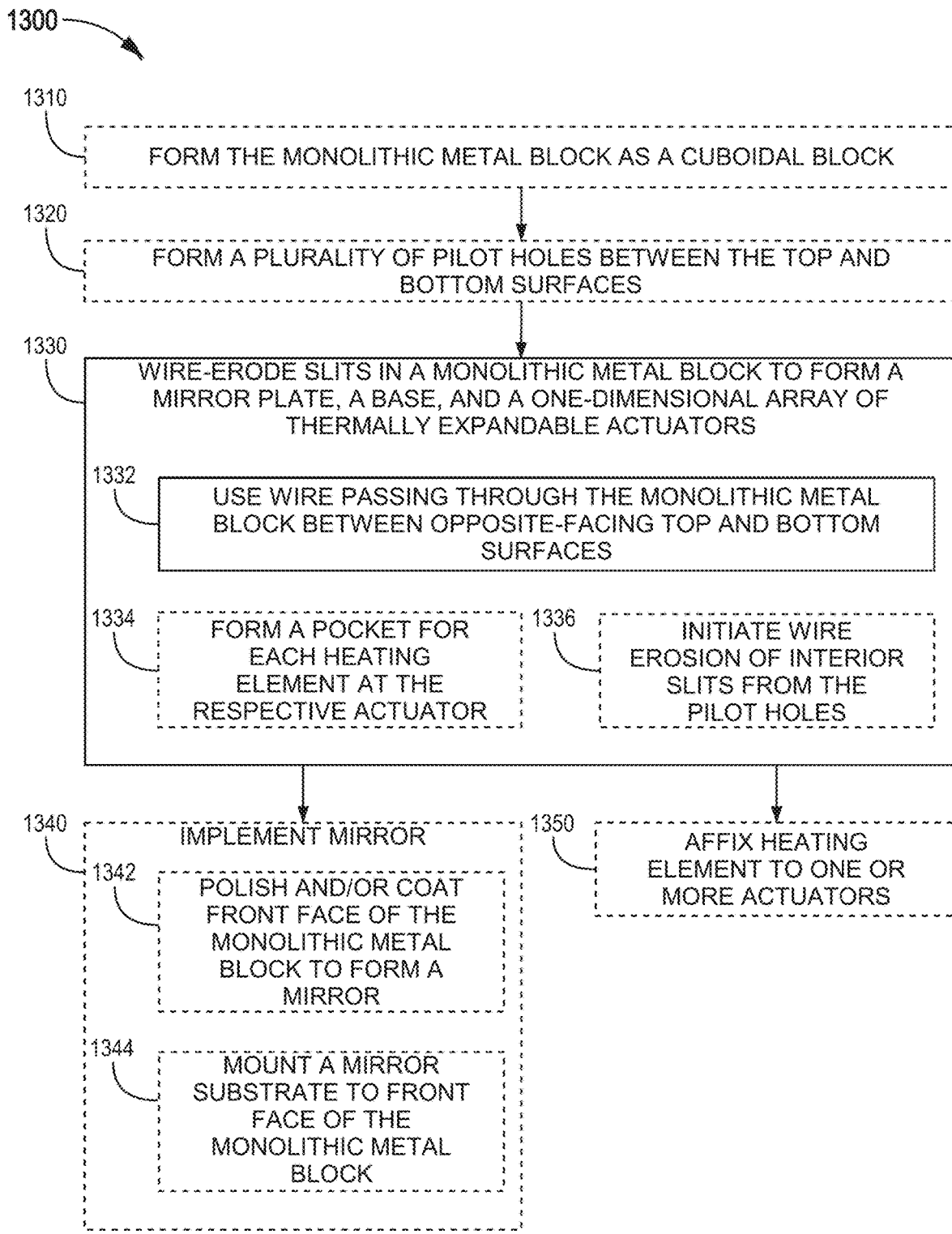
FIG. 13 illustrates a wire-erosion-based method for manufacturing a thermally actuated deformable mirror device, according to an embodiment.

Slits 110 may be machined in monolithic block 200 using a variety of machining methods, such as wire erosion, laser cutting, and milling. Wire erosion, discussed in further detail below in reference to FIG. 13, is applicable to metal embodiments of monolithic block 200 and is particularly advantageous from a cost perspective. As an alternative to forming slits 110 by removal of material, additive manufacturing may form monolithic block 200 with slits 110. However, under most circumstances, we expect that machining, especially wire-erosion, of slits 110 is more cost-effective than additive manufacturing.

When slits 110 are formed by material removal, the width 214S of slits 110 (regardless of their orientation in the xz-plane) may be defined by practical considerations related to the material removal process. For example, in embodiments where slits 110 are formed by wire-erosion, width 214S may be in the range between 0.1 and 0.5 millimeters (mm), such as in the range between 0.3 and 0.35 mm.

Monolithic block 200 has length 204L (along the z-axis), width 204W (along the x-axis), and height 204H (along the y-axis). The size of monolithic block 200 may be designed according to a variety of considerations, including (a) the beam size of a laser beam to be wavefront-manipulated by device 180, (b) the desired stroke by each actuator 130 (i.e., (z-axis travel of front end 232F relative to rear end 232R), and (c) the required heat-sinking capacity of base 140. In certain embodiments, monolithic block 200 is designed for wavefront-manipulation of a laser beam with footprint, at front face 122F, of between 1 and 3 mm. In these embodiments, height 204H may be in the range between 3 and 10 mm to accommodate the laser beam and allow for some variation or inaccuracy in the location of the laser beam on mirror 170. Even in situations where the location of the laser beam is defined to high accuracy, it may be advantageous to keep height 204H in the 3-10 mm range so as to maintain good structural stability against bending of monolithic block 200 in directions parallel to the y-axis. In an embodiment, width 204W exceeds height 204H, for example to accommodate actuators 130 of a width 234W that is at least 4 mm and/or to achieve a desired heat-sinking capacity of base 140. Width 204W may be in the range between 15 and 25 mm. Base 140 may have length 244L, along the z-axis, in the range between 10 and 30 mm in order to provide sufficient heat sinking as well as allow for anchoring of base 140 to an external fixture. Length 204L may be in the range between 20 and 60 millimeters.

Each actuator 130 may have length 234L, along the z-axis, in the range between 5 and 30 mm in order to achieve a stroke of, for example, between 0.5 and 10 microns in the 20-40° C. temperature range. The dynamic range for deformation and tilt of mirror plate 120 is at least partly defined by (a) the separation 234M between the outermost front connectors 260(1) and 260(3) and (b) the thickness 224L of mirror plate 120 along the z-axis. The dynamic range may be limited by several other factors, including thermal crosstalk between actuators 130 and the flexural stiffness of front connectors 260. While less force is needed to deform a mirror plate 120 with a small thickness 224L, smoother deformation may be ensured by a larger thickness 224L. Deformation of an embodiment of mirror plate 120 having a large thickness 224L may benefit from a large separation 234M between the outermost front connectors 260(1) and 260(3). In one example, separation 234M is between 10 and 15 millimeters, thickness 224L is between 0.5 and 3 mm (for example between 1 and 2 mm), and the stroke by central actuator 130(2) relative to outer actuators 130(1) and 130(3) is between 0.5 and 5 microns in a temperature operating range of 20-40° C.

Figure 3A:
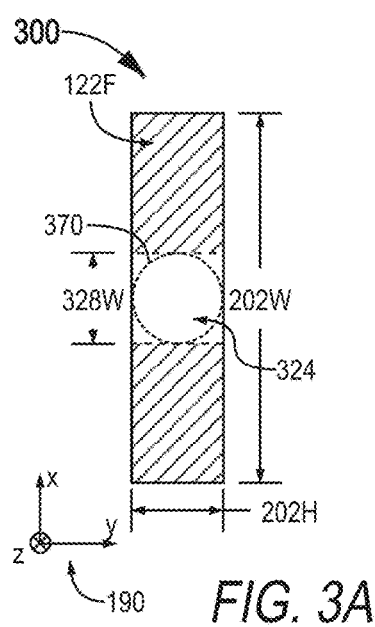
FIGS. 3A and 3B illustrate a monolithic three-actuator block with a polished mirror surface, according to an embodiment.
Figure 3B:
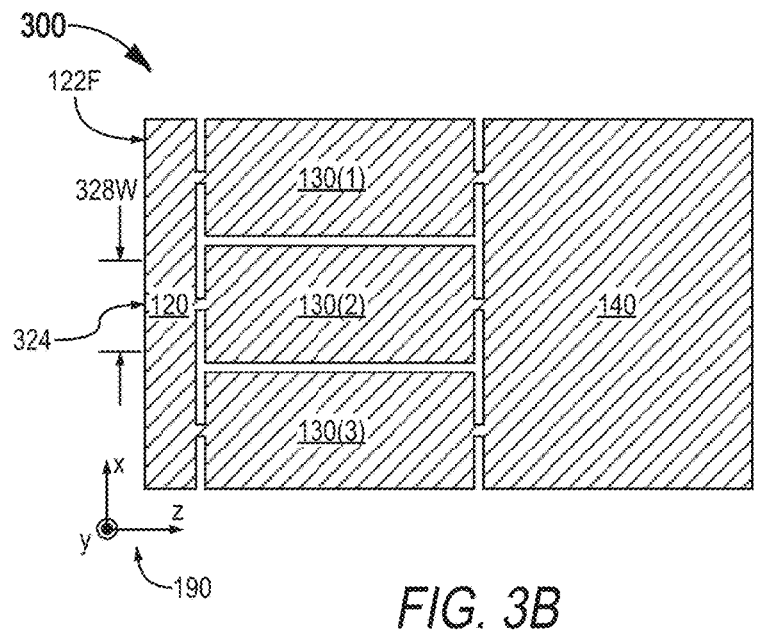

FIGS. 3A and 3B illustrate one monolithic three-actuator block 300 with a polished mirror surface 370. FIG. 3A is a front view of monolithic block 300, and FIG. 3B is a top view of monolithic block 300. Monolithic block 300 is an embodiment of monolithic block 200 that is made of metal, e.g., aluminum, and wherein at least a portion front face 122F is polished to form a mirror surface 324.

In one example, the entire front face 122F is polished. However, in many use scenarios, the size of front face 122F significantly exceeds the required active area. Thus, in another example, depicted in FIG. 3A, only a central portion of front face 122F, limited to a width 328W, is polished. Mirror surface 324 may be circular, as indicated by short-dashed line 370, or rectangular as indicated by long-dashed lines spaced apart by width 328W. Mirror surface 324 may span the full height 202H of front face 122F, or only a portion thereof.

Figure 4:
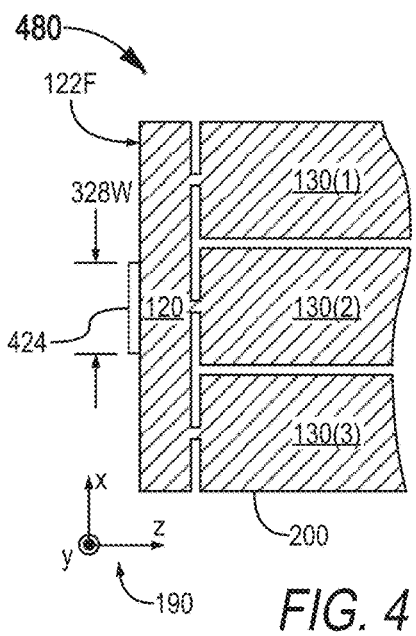
FIG. 4 illustrates a device for thermally actuating a deformable mirror formed as a coating on a front face of a monolithic actuator-block, according to an embodiment.

FIG. 4 illustrates one device 480 for thermally actuating a deformable mirror formed as a coating on a front face of a monolithic actuator-block. Device 480 is an embodiment of device 180 implementing monolithic block 200. FIG. 4 is a top view of a front section of device 480, omitting base 140 and rear ends 232R of actuators 130. Device 480 includes a mirror coating 424 on front face 122F of monolithic block 200. The thickness of mirror coating 424, along the z-axis, is exaggerated for clarity in FIG. 4. Mirror coating 424 is an embodiment of mirror 170 and may be dielectric or metallic. The extent of mirror coating 424 on front face 122F is similar to mirror surface 324 of monolithic block 300.

Figure 5:
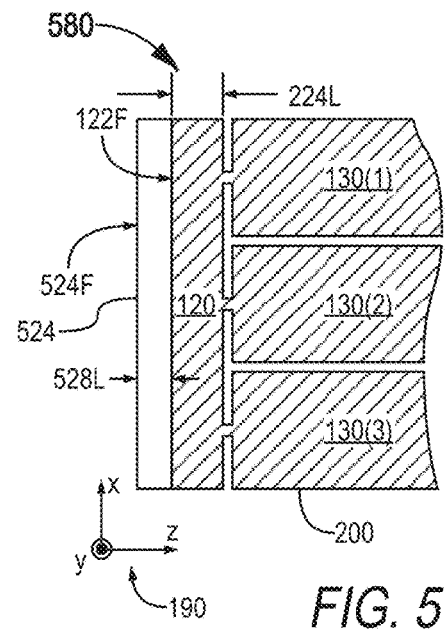
FIG. 5 illustrates a device for thermally actuating a deformable mirror bonded to a front face of a monolithic actuator-block, according to an embodiment.

FIG. 5 illustrates one device 580 for thermally actuating a deformable mirror bonded to a front face of a monolithic actuator-block. Device 580 is an embodiment of device 180 implementing monolithic block 200. FIG. 5 is a top view of a front section of device 580, omitting base 140 and rear ends 232R of actuators 130. Device 580 includes a bendable mirror substrate 524 bonded to front face 122F of monolithic block 200. Mirror substrate 524 has a mirror surface 524F that faces in the same direction as front face 122F. Mirror surface 524F may have a coating deposited thereon.

In the example depicted in FIG. 5, mirror substrate 524 has the same size as front face 122F. In another example, mirror substrate 524 is smaller than front face 122F. In this example, mirror substrate 524 may be rectangular with width 328W or circular with diameter 328W, as discussed above for mirror surface 324.

Mirror substrate 524 has thickness 528L along the z-axis. In an embodiment, thickness 528L is only a fraction of thickness 224L, to minimize shearing forces at the interface between front face 122F and mirror substrate 524 upon deformation of mirror plate 120 and mirror substrate 524. In this embodiment, thickness 528L may be 50% of thickness 224L or less. Mirror substrate 524 is, for example, a silicon wafer.

Figure 6A:
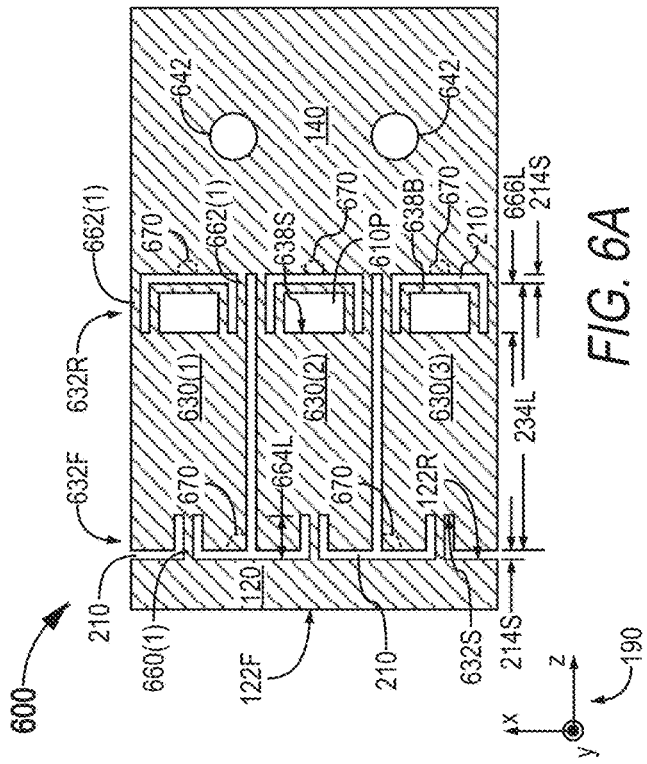
FIGS. 6A and 6B illustrate a monolithic block with elongated front and rear connectors that connecting actuator to a mirror plate and a base, respectively, according to an embodiment.
Figure 6B:
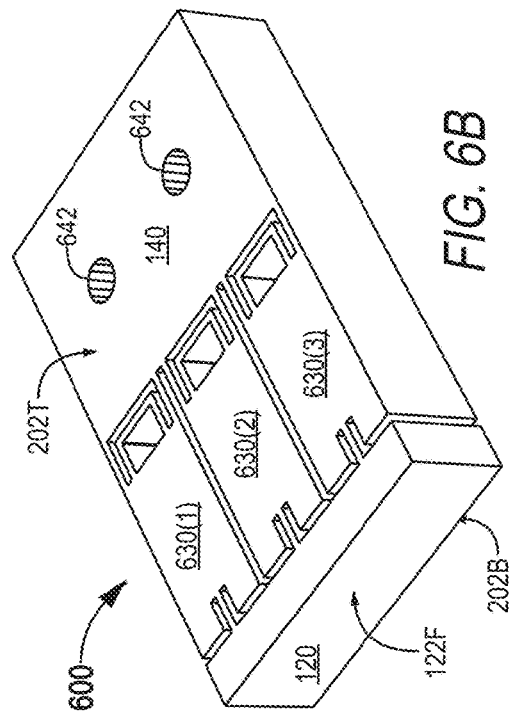

FIGS. 6A and 6B illustrate one monolithic block 600 with elongated front and rear connectors 660 and 662 connecting actuators 130 to mirror plate 120 and base 140, respectively. FIGS. 6A and 6B are top and perspective views, respectively, of monolithic block 600. Monolithic block 600 is an embodiment of monolithic block 200 and may be implemented with mirror surface 324, mirror coating 424, or mirror substrate 524 discussed above in reference to FIGS. 3-5.

Monolithic block 600 includes mirror plate 120, base 140, three actuators 630, one front connector 660 for each actuator 630, and a pair of rear connectors 662 for each actuator 630. Each front connector 660 connects rear face 122R of mirror plate 120 to a front-facing surface 632S of a front end 632F of actuator 630. Front-facing surface 632S is recessed in front end 632F. The length 664L of each front connector 660 thereby exceeds width 214S of slits 210. Similarly, the length 666L of each rear connector 662 exceeds width 214S of slits 210. Each of lengths 664L and 666L may be around 2 mm or greater to provide good thermal isolation between actuators 630 and base 140 as well as to provide flexibility to allow deformation and/or tilt of mirror plate 120.

As shown in FIGS. 6A and 6B, each front connector 660 may be centered with respect to the associated actuator 630 in the x-dimension, and each pair of rear connectors 662 may be aligned to the x-dimension-extremes of the associated actuator 630.

Optionally, monolithic block 600 forms a pocket 610P in a rear end 632R of each actuator 630. Each pocket 610P is configured to accommodate a heating element 150 on a rear-facing surface 638S of the associated actuator 630. In each actuator 630, a barrier 638B cooperates with surface 638S to surround pocket 610. Barriers 638B may help prevent heating elements 150 from radiatively heating base 140.

In certain embodiments of monolithic block 600, slits 210 are formed by wire erosion, with the wire being parallel to the y-axis. Wire-erosion of those of slits 210 that do not connect to a periphery of monolithic block 600, in the xz-plane, may require drilling of a pilot hole for passing the wire through monolithic block between top surface 202T and bottom surface 202B. Thus, monolithic block 600 may, after wire erosion of slits 210, form additional voids 670 that are remnants of such pilot holes. Each void 670 spans between top surface 202T and bottom surface 202B.

Monolithic block 600 may further form one of more holes 642 in base 140 to facilitate anchoring of base 140 to an external fixture.

Figure 7A:
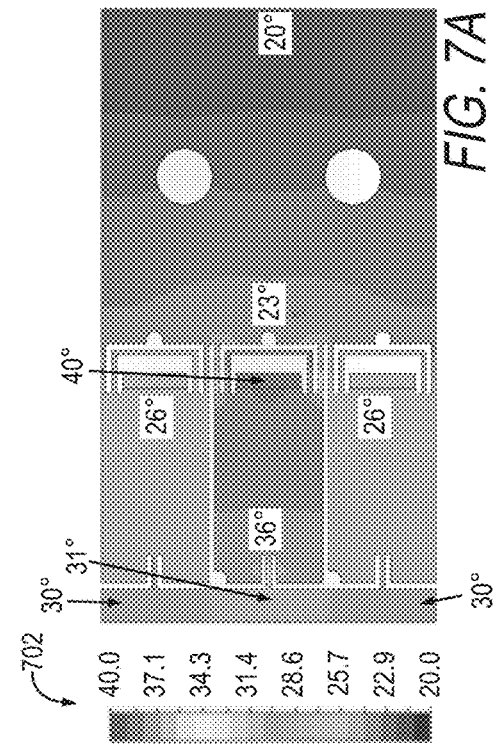
FIGS. 7A and 7B show results of thermal finite-element-analysis of an example of the monolithic block of FIGS. 6A and 6B.
Figure 7B:
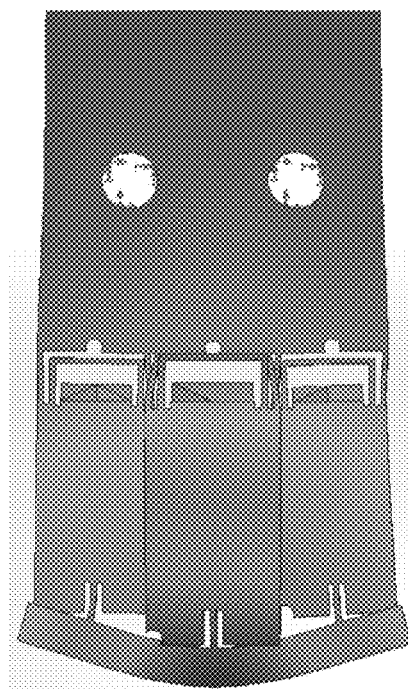

FIGS. 7A and 7B show results of thermal finite-element-analysis of monolithic block 600 when a heating element 150 affixed to surface 638S of the central actuator 630(2) is heated to 40° C. while the ambient environment is at 20° C. FIG. 7A is a temperature map of monolithic block 600, indicated in grayscale according to key 702. To help guide the reader, approximate temperatures are indicated for certain locations. FIG. 7B is a corresponding displacement map. The shape and size of monolithic block 600 shown in FIG. 7A is to scale. The length 202L, width 202W, and height 202H of the example of monolithic block 600 analyzed here are 36.6 mm, 20 mm, and 5 mm, respectively. Displacements shown in FIG. 7B are greatly exaggerated for clarity. In this analysis, the actual displacement of front end 632F of central actuator 630(2), when heated as shown in FIG. 7A, slightly exceeds 6 microns.

This analysis demonstrates deformation of front face 122F to a convex cylindrical shape by heating of central actuator 630(2). A concave cylindrical shape of front face 122F may be achieved by instead heating the outer actuators 630(1) and 630(3). Uniform heating of all three actuators 630 may be used to translate front face 122F in the negative z-direction. A tilt of front face 122F in the xz-plane may be achieved, for example, by heating both actuator 630(1) and 630(2) but not actuator 630(3), such that the actuator 630(2) is hotter than 630(3) and cooler than 630(1).

Some scenarios may require higher-order deformation. For example, it may be necessary to deform a mirror surface into an S-shape.

Figure 8A:
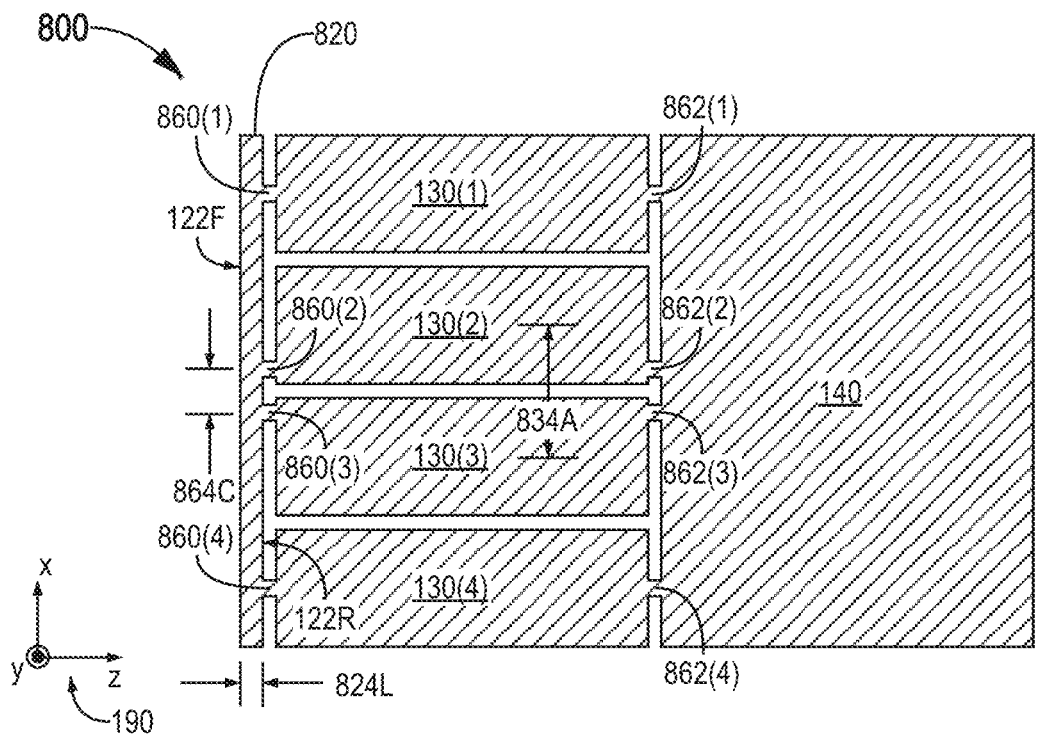
FIGS. 8A and 8B illustrate a four-actuator monolithic block capable of S-shaped deformation of a mirror, according to an embodiment.
Figure 8B:
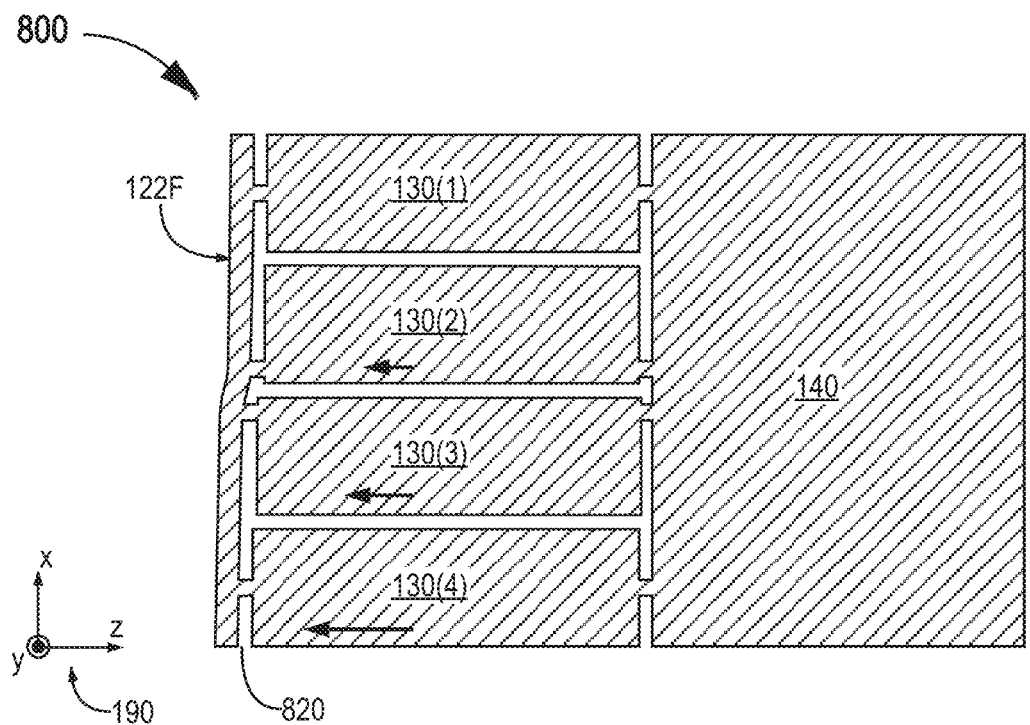

FIGS. 8A and 8B illustrate one four-actuator monolithic block 800. Monolithic block 800 is a modification of monolithic block 200 that is further capable of deforming front face 122F into an S-shape. FIG. 8A shows monolithic block 800 when at uniform temperature, and FIG. 8B shows monolithic block 800 when heated to achieve an S-shaped front face 122F. Monolithic block 800 may be implemented with mirror surface 324, mirror coating 424, or mirror substrate 524 discussed above in reference to FIGS. 3-5.

Monolithic block 800 includes four actuators 130(1-4) distributed along the x-axis. When the temperature of actuator 130(3) exceeds the temperature of actuator 130(2) by a sufficient amount, front face 122F becomes S-shaped as shown in FIG. 8B. The temperature of actuators 130(1) and 130(4) may be set to achieve a desired tilt or lower-order curvature of front face 122F. For example, as shown in FIG. 8B, an overall tilt is achieved when actuator 130(4) is hotter than actuator 130(3) and actuator 130(1) is colder than actuator 130(2).

Monolithic block 800 implements a mirror plate 820 with thickness 824L along the z-axis. To enable higher-order deformation of front face 122F, thickness 824L may be less than 1 mm, for example around 0.5 mm. Each actuator 130 is connected to mirror plate 820 by a single front connector 860 and to base 140 by at least one rear connector 862. In order to produce a relatively tight S-curve in front face 122F, the center-to-center spacing 864C of the two central front connectors 860(2) and 860(3) is less than the center-to-center spacing 834A of the two central actuators 130(2) and 130(3).

The design of monolithic block 800 is readily extended to include more than four actuators 130, for example for the purpose of achieving even higher-order mirror deformation.

FIG. 9 is a top plan view of one four-actuator monolithic block 900 with leverage-enhanced outer actuation. Monolithic block 900 is a modification of monolithic block 800 that (a) implements actuators 130(1-4) as actuators 930(1-4), (b) includes a pair of brackets 942 bracketing the actuator array in the x-dimension, and (c) replaces front connectors 860(1) and 860(4) with leverage-assisted front connectors 960(1) and 960(4).

For each outer actuator 930, the associated front connector 960 includes (i) a front leg 960F connecting to rear face 122R of mirror plate 820, (ii) a rear leg 960R connecting to a front end of outer actuator 930, (iii) a rear leg 960T connecting to a front end of an adjacent bracket 942, and (iv) a bridge 960B that bridges between front leg 960F, rear leg 960R, and rear leg 960T. Each bracket 942 is relatively rigidly connected to base 140 such that, when outer actuator 930 is heated and hence displaced in the negative z-direction as indicated by arrow 970 at outer actuator 930(4), bridge 960B pivots in the xz-plane about a pivot axis 972 as indicated by arrow 974 for outer front connector 960(4). Each front connector 960 thus acts as a lever on mirror plate 820 at the locations where front legs 960F connect to rear face 122R.

As compared to monolithic block 800, leverage-assisted front connectors 960 of monolithic block 900 increases the action by outer actuators 930(1) and 930(4) on mirror plate 820 and shifts this action to more central locations. The center-to-center distance 964W along the x-axis between front legs 960F of outer actuators 960(1) and 960(4) is less than the collective span 934W along the x-axis of central actuators 930(2) and 930(3). As a result, the x-dimension span of each front connector 960 overlaps with the x-dimension span of the nearest central actuator 930(2) or 930(3).

Figure 10:
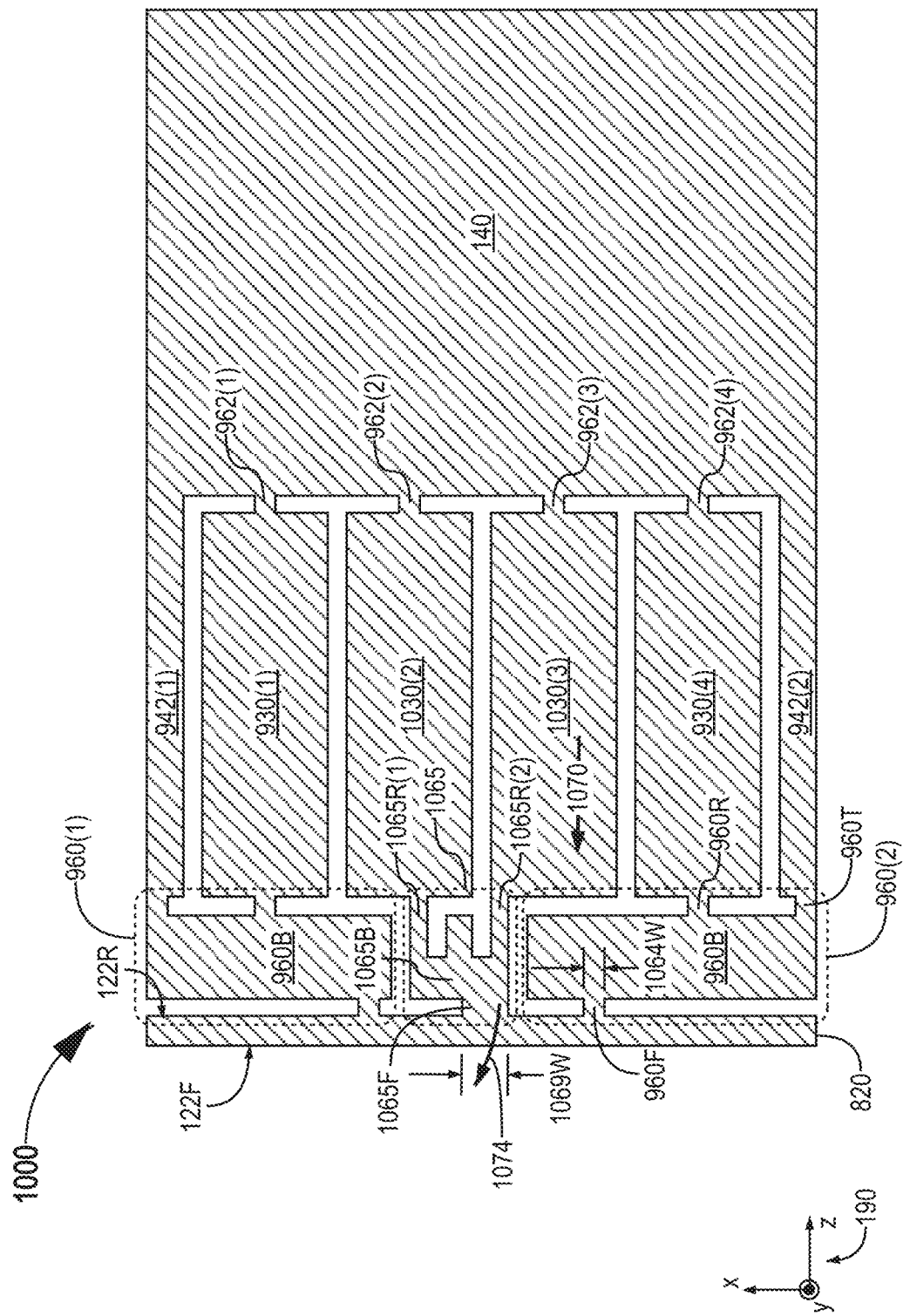
FIG. 10 illustrates a four-actuator monolithic block with central actuation that acts directly on the local orientation of the mirror plate, according to an embodiment.

FIG. 10 is a top plan view of one four-actuator monolithic block 1000 with central actuation that acts directly on the local orientation of the mirror plate. Monolithic block 1000 also implements the leverage-enhanced outer actuation discussed above for monolithic block 900. Monolithic block 1000 is a modification of monolithic block 900 that (a) replaces central actuators 930(2) and 930(3) with central actuators 1030(2) and 1030(3), and (b) replaces central front connectors 860(2) and 860(3) with a single, shared front connector 1065.

Front connector 1065 includes (i) a front leg 1065F connecting to rear face 122R of mirror plate 820, (ii) rear legs 1065R(1) and 1065R(2) connecting to the front ends of central actuator 1030(2) and 1030(3), respectively, and (iii) a bridge 1065B that bridges between front leg 1065F and rear legs 1065R(1) and 1065R(2). Front leg 1065F has width 1069W along the x-axis. Width 1069W exceeds the width 1064W of front leg 960F of each outer front connector 960(1) and 960(2), such that the flexural stiffness of front leg 1065F and its junction with rear face 122R, is high compared to the flexural stiffness of front legs 960F and their junctions with rear face 122R. As a result, the local orientation of mirror plate 820 in the xz-plane is rigidly tied to the orientation of bridge 1065B. For example, when central actuator 1030(3) is heated to expand in the negative z-axis direction, as indicated by arrow 1070, bridge 1065B, front leg 1065, and the associated local portion of mirror plate 820 pivot as indicated by arrow 1074. Rear legs 1065R(1) and 1065R(2) have lower flexural stiffness and can therefore flex in the xz-plane to allow this pivoting.

As compared to the central actuation of monolithic block 900, which acts on two different locations of mirror plate 820 to change its orientation therebetween, front connector 1065 of monolithic block 1000 functions acts directly on the local orientation of mirror plate 820. The action of front connector 1065 may reduce non-smoothness of the mirror plate deformation potentially occurring with the two-point central actuation in monolithic block 900. In addition, front connector 1065 is designed as a lever arm and the leverage resulting from the x-dimension distance between rear connectors 1065R(1) and 1065(2) may add strength to the central actuation.

Figure 11A:
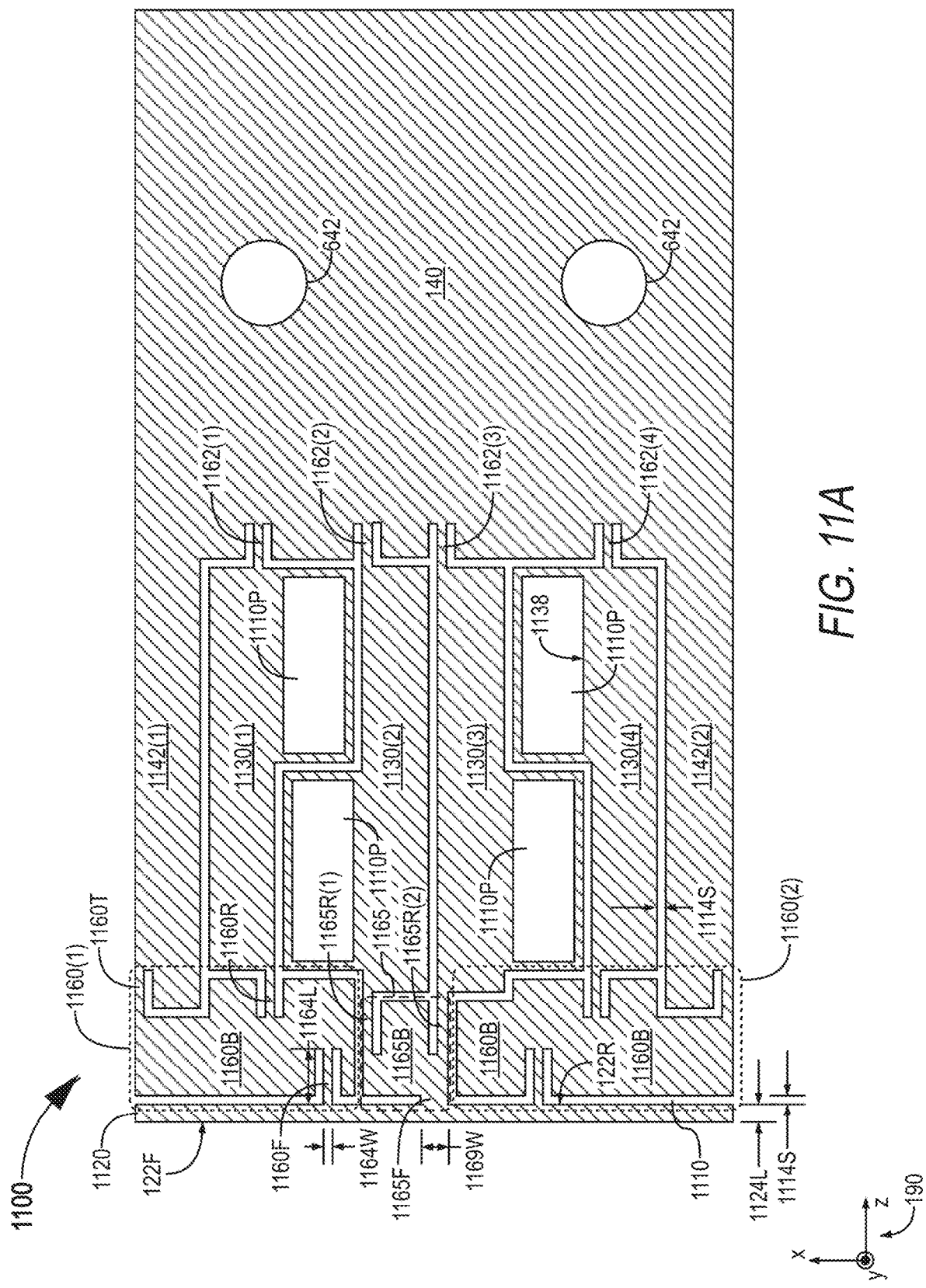
FIGS. 11A and 11B illustrate a four-actuator monolithic block with leverage-enhanced outer and central actuation, according to an embodiment.
Figure 11B:
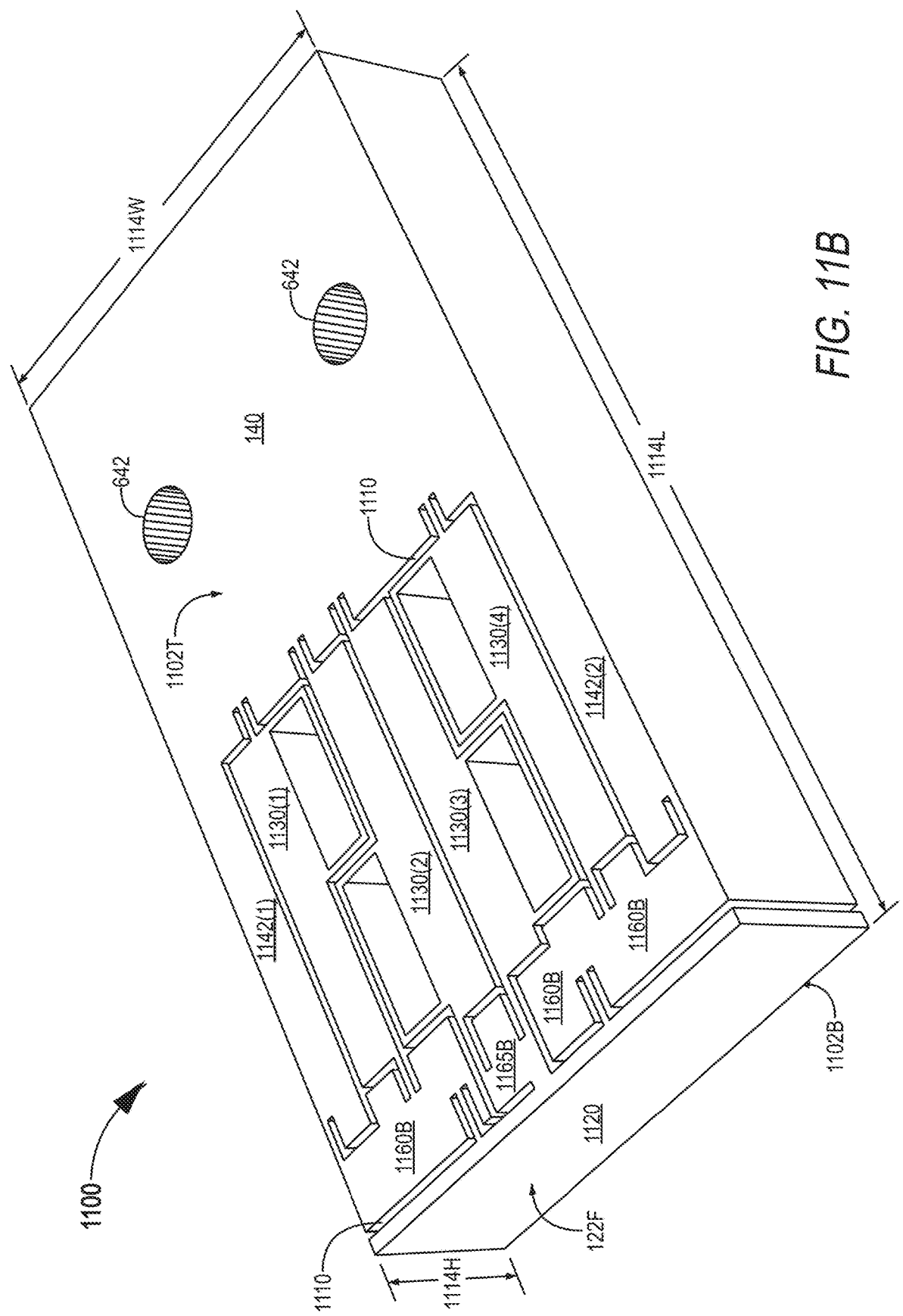

FIGS. 11A and 11B illustrate, in top plan view and perspective view, respectively, one four-actuator monolithic block 1100 with leverage-enhanced outer and central actuation. Monolithic block 1100 is an embodiment of monolithic block 1000 with elongated rear connectors between the actuators and the base, elongated front legs of the front connectors between the outer actuators and the mirror plate, and elongated rear legs of all front connectors.

Monolithic block 1100 includes base 140, a mirror plate 1120, four actuators 1130, and two brackets 1142. Monolithic block 1100 further includes four rear connectors 1162, each connecting a respective actuator 1130 to base 140. Monolithic block 1100 also includes a central front connector 1165 that connects central actuators 1130(2) and 1130(3) to rear face 122B of mirror plate 1120, and two outer front connectors 1160 each connecting an outer connector 1130(1) or 1130(4) and its adjacent bracket 1142(1) or 1142(2) to rear face 122B. Base 140, mirror plate 1120, actuators 1130, brackets 1142, rear connectors 1162, central front connector 1165, and outer front connectors 1160 are defined in monolithic block 1100 by slits 1110 spanning between a top surface 1102T and a bottom surface 1102B of monolithic block 1100, similarly to slits 210 of monolithic block 200.

Central front connector 1165 includes a front leg 1165F, rear legs 1165R(1) and 1165R(2), and a bridge 1165B (examples of front leg 1065F, rear legs 1065R(1) and 1065R(2), and a bridge 1065B, respectively, of monolithic block 1000). Each outer front connector 1160 includes a front leg 1160F, a rear leg 1160R, a rear leg 1160T, and a bridge 1160B (examples of front leg 960F, a rear leg 960R, a rear leg 960T, and a bridge 960B, respectively, of monolithic block 900/1000).

Each front leg 1160F, rear leg 1160R, rear leg 1160T, rear leg 1165R, and rear connector 1162 may have length 1164L along the z-axis and width 1164W along the x-axis. Length 1164L may be similar to length 664L of front connectors 660 and rear connectors 662 of monolithic block 600, and width 1164W may be similar to width 268W of front connectors 260 and rear connectors 262 of monolithic block 200, so as to provide thermal isolation of actuators 1130 as well as enable flex in the xz-plane to deform and/or tilt mirror plate 1120. The width 1169W of front leg 1165F of central front connector 1165 may be at least approximately twice as large as width 1164W, to essentially rigidly couple bridge 1165B to mirror plate 1120.

Optionally, monolithic block 1100 forms a pocket 1110P in each actuator 1130. Each pocket 1110P is configured to accommodate a heating element 150 on a surface 1138S of the associated actuator 1130. Pockets 1110P are similar to pockets 610P of monolithic block 600. Monolithic block 1100 may further form one of more holes 642 in base 140 to facilitate anchoring of base 140 to an external fixture.

Slits 1110 have a width 1114S in the xz-dimensions and orthogonal to the traversed path. Width 1114S may be similar to width 214S of slits 210. In one embodiment, slits 1110 are formed by wire erosion and transverse extent 1114S is in the range between 0.1 and 0.5 millimeters (mm), such as in the range between 0.3 and 0.35 mm. Monolithic block 1100 has length 1114L, width 1114W, and height 1114H, which may be similar to length 204L, width 204W, and height 204H, respectively, on monolithic block 200/600. Monolithic block 1100 may further form voids that are remnants of pilot holes used to initiate wire erosion of slits 1100 that do not connect to the periphery of monolithic block 1100. For clarity, these voids are not shown in FIGS. 11A and 11B.

Figure 12A:
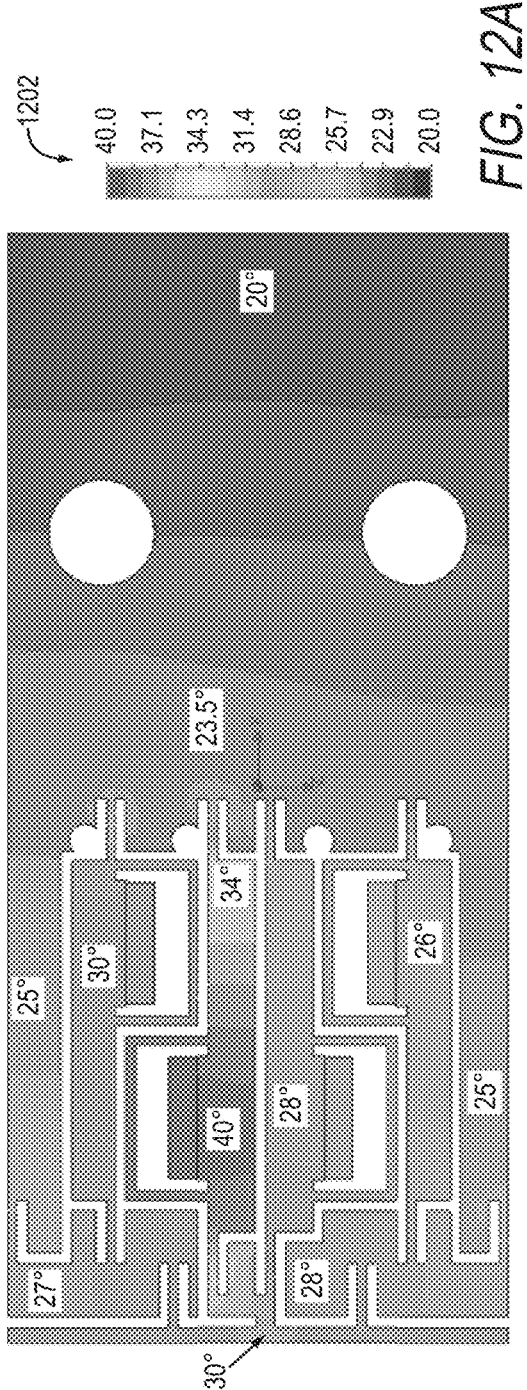
FIGS. 12A and 12B show results of thermal finite-element-analysis of an example of the monolithic block of FIGS. 11A and 11B.
Figure 12B:
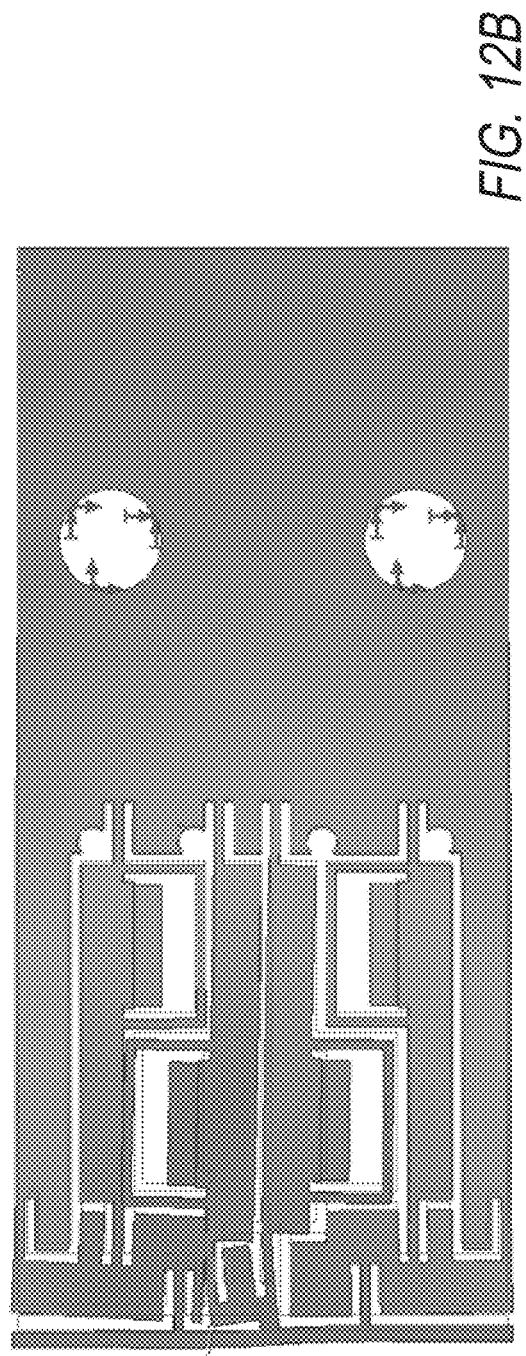

FIGS. 12A and 12B show results of thermal finite-element-analysis of monolithic block 1100 when a heating element 150 affixed to surface 638S of central actuator 1130(2) is heated to 40° C., and a heating element 150 affixed to surface 638S of outer actuator 1130(1) is heated to 30° C., while the ambient environment is at 20° C. FIG. 12A is a temperature map of monolithic block 1100, indicated in grayscale according to key 1202. To help guide the reader, approximate temperatures are indicated for certain locations. FIG. 12B is a corresponding displacement map. The shape and size of monolithic block 1100 shown in FIG. 12A is to scale. The length 1102L, width 1102W, and height 1102H of the example of monolithic block 1100 analyzed here are 35.5 mm, 16 mm, and 5 mm, respectively. Displacements shown in FIG. 12B are greatly exaggerated for clarity. In this analysis, the actual displacement of the front end of central actuator 1130(2), when heated as shown in FIG. 12A, is approximately 7 microns.

This analysis demonstrates S-shaped deformation of mirror plate 1120. Other types of deformation, as well as tilt and translation, of mirror plate 1120 may be achieved with other temperatures of actuators 1130.

FIG. 13 is a flowchart for one wire-erosion-based method 1300 for manufacturing a thermally actuated deformable mirror device. Method 1300 may be used to manufacture metal embodiments of monolithic blocks 100, 200, 300, 600, 800, 900, 1000, and 1100, as well as related embodiments of devices 180, 480, and 580.

Method 1300 includes a step 1330 of wire-eroding slits in a monolithic metal block to form a mirror plate, a base, and a 1D-array of thermally expandable actuators. Step 1330 includes a step 1332 of using a wire to perform the wire erosion, wherein the wire passes through the monolithic metal between opposite top and bottom surfaces thereof. In one example, step 1330 acts on a solid metal block of length 204L, width 204W, and height 204H (similar to monolithic block 200 without slits 210). In this example, slits 210 are eroded by a wire that passes through the metal block between top surface 202T and bottom surface 202B, so as to form monolithic block 200.

Certain embodiments of method 1300 further include a step 1340 of implementing a mirror on a front face of the monolithic metal block. In one such embodiment, step 1340 includes a step 1342 of polishing and/or coating a front face of the mirror plate of the monolithic metal block to form a mirror, for example as discussed above in reference to FIGS. 3A, 3B, and 4. In another such embodiment, step 1340 includes a step 1344 of mounting a mirror substrate to the front face of the monolithic metal block, for example as discussed above in reference to FIG. 5.

Method 1300 may include a step 1350 of affixing a heating element to one or more of the actuators. In one example of step 1350, a heating element 150 is affixed to each actuator 130 of monolithic block 100. Step 1330 may include wire eroding a pocket in each heating element, for example to form pockets 610P of monolithic block 600 or to form pockets 1110P of monolithic block 1100. In embodiments of method 1300 that include both of steps 1334 and 1350, step 1350 may place each heating element in a corresponding pocket.

In one embodiment of method 1300, to form slits that do not reach the periphery of the metal block in dimensions parallel to the top and bottom surfaces, step 1330 include a step 1336 of initiating wire erosion of such slits from pre-drilled pilot holes. This embodiment of method 1330 may further include a step 1320 of forming such pilot holes before performing wire erosion in step 1330. In one example of this embodiment, wire erosion of monolithic block 600 is preceded by drilling of the pilot holes ultimately resulting in voids 670, as discussed above in reference to FIGS. 6A and 6B. In this embodiment of method 1300, step 1330 may utilize a self-feeding wire erosion machine to feed the wire through each pilot hole in step 1336.

Method 1300 may further include a step 1310 of first forming a cuboidal block, for example having length 204L, width 204W, and height 204H, to be processed by wire erosion in step 1330 and, optionally, predrilled in step 1320.

Method 1300 may be modified or extended to form slits that are at an oblique angle to the top and bottom surfaces. In such an implementation, the metal block is rotated such that its top and bottom surfaces are not orthogonal to the wire. In fact, by rotating the metal block during wire erosion, slits with corkscrew-like rotation may be formed. These techniques may be used to form more complex monolithic block-structures for actuation of deformable mirrors.

The present invention is described above in terms of a preferred embodiment and other embodiments. The invention is not limited, however, to the embodiments described and depicted herein. Rather, the invention is limited only by the claims appended hereto.

What is claimed is:

1. A device for thermally actuating a deformable mirror, comprising:
   a monolithic block including:
      a mirror plate having a front face forming or configured to support a mirror,
      a base,
      a one-dimensional array of thermally expandable actuators mechanically connecting a rear face of the mirror plate to the base such that at least one of shape, tilt, and location of the front face depends on temperature of the thermally expandable actuators, each thermally expandable actuator having a front end closest to the mirror plate and a rear end closest to the base,
      a plurality of front connectors mechanically connecting a rear face of the mirror plate to the front ends of the thermally expandable actuators, each front connector being characterized by a thermal impedance to heat flow between the mirror plate and each front end in direct mechanical connection with the front connector; and
      a plurality of rear connectors mechanically connecting the base to the rear ends of the thermally expandable actuators, each rear connector being characterized by a thermal impedance to heat flow between the base and each rear end in direct mechanical connection with the rear connector;
   wherein the thermal impedance of the front connectors and the thermal impedance of the rear connectors exceeds a thermal impedance of each thermally expandable actuator to heat flow between its front and rear ends, and the mirror plate, base, front connectors, rear connectors, and thermally expandable actuators are defined by slits spanning between opposite-facing top and bottom surfaces of the monolithic block.

2. The device of claim 1, further comprising one or more heating elements each affixed to a respective thermally expandable actuator.

3. The device of claim 1, wherein all surfaces of the monolithic block defined by the slits are orthogonal to the top and bottom surfaces.

4. The device of claim 1, wherein the monolithic block is made of a metal.

5. The device of claim 4, wherein thermal conductivity of the metal is less than 30 W/(m·K).

6. The device of claim 4, wherein thermal conductivity of the metal is greater than 100 W/(m·K).

7. The device of claim 1, wherein the one-dimensional array of thermally expandable actuators is distributed along a width of the monolithic block, the monolithic block has a height from the bottom surface to the top surface, and the width is at least three times the height.

8. The device of claim 1, wherein the front face of the mirror plate is polished to form the mirror.

9. The device of claim 1, further comprising, on the front face, one or more coatings forming the mirror.

10. The device of claim 1, further comprising the mirror, wherein the mirror includes a substrate mounted on the front face of the mirror plate.

11. The device of claim 1, wherein
   the monolithic block has a length between the front face of the mirror plate and a rear face of the base and a height between the top and bottom surfaces,
   the one-dimensional array of thermally expandable actuators is distributed along a width of the monolithic block, the length, the height, and the width being mutually orthogonal, and
   the front and rear connectors have lower flexural stiffness in directions parallel to a plane defined by the width and the length than in direction along the height.

12. The device of claim 1, wherein the mirror plate is mechanically connected to each thermally expandable actuator via a single respective one of the front connectors.

13. The device of claim 12, wherein the monolithic block has a length between the front face of the mirror plate and a rear face of the base, and each front connector extends from a front-facing surface of the corresponding thermally expandable actuator along the length of the monolithic block to the rear face of the mirror plate.

14. The device of claim 13, wherein
   the monolithic block has a height between the top and bottom surfaces,
   the one-dimensional array of thermally expandable actuators is distributed along a width of the monolithic block, the length, the height, and the width being mutually orthogonal, and
   extent of each front connector along the width is less than one tenth of extent of the corresponding thermally expandable actuator along the width.

15. The device of claim 1, comprising four thermally expandable actuators distributed along a width of the monolithic block.

16. A device for thermally actuating a deformable mirror, comprising:
   a monolithic block including:
      a base,
      a mirror plate having a front face forming or configured to support a mirror, the monolithic block having a length between the front face of the mirror plate and a rear face of the base,
      a one-dimensional array of four thermally expandable actuators distributed along a width of the monolithic block and mechanically connecting the rear face of the mirror plate to the base such that at least one of shape, tilt, and location of the front face depends on temperature of the thermally expandable actuators, each thermally expandable actuator having a front end closest to the mirror plate and a rear end closest to the base, the four thermally expandable actuators including two outer actuators, and two central actuators located between the two outer actuators,
      a plurality of front connectors mechanically connecting a rear face of the mirror plate to the front ends of the thermally expandable actuators, the front connectors including a single central front connector that mechanically connects the mirror plate to the front end of each of the two central actuators, such that temperature of the two central actuators control a torque leveraged by the single central front connector on the mirror plate in a plane defined by the width and the length, and a plurality of rear connectors mechanically connecting the base to the rear ends of the thermally expandable actuators;

wherein the mirror plate, base, front connectors, rear connectors, and thermally expandable actuators are defined by slits spanning between opposite-facing top and bottom surfaces of the monolithic block.

17. The device of claim 16, wherein the single central front connector includes:

a front leg extending from the mirror plate along the length in direction toward the base, two rear legs extending from the front ends of the two central actuators, respectively, along the length in direction toward the mirror plate, and a bridge extending along the width and bridging the two rear legs to the front leg.

18. The device of claim 17, wherein the rear legs have lower flexural stiffness, in directions parallel to the plane defined by the width and the length, than each of the front leg, the bridge, junction between the front leg and the bridge, and junction between the front leg and the mirror plate.

19. The device of claim 16, wherein the monolithic block further includes a pair of brackets extending from the base along the length in direction toward the mirror plate and bracketing the four thermally expandable actuators in dimension along the width, and the front connectors further include two outer front connectors, each outer front connector mechanically connecting both a respective one of the outer actuators and an adjacent one of the brackets to the mirror plate at a connection point that, in dimension along the width, is more central than the outer actuator.

20. The device of claim 19, wherein each central front connector includes a central-connector leg extending from the mirror plate along the length in direction toward the base, each outer front connector includes an outer-connector leg extending from the mirror plate along the length in direction toward the base, and flexural stiffness of the central-connector leg and its junction with the mirror plate is greater than flexural stiffness of each outer-connector leg and its junction with the mirror plate.

21. The device of claim 19, wherein each outer front connector includes:

a front leg extending from the connection point along the length in direction toward the base, a first rear leg extending from the front end of the respective one of the outer actuators along the length in direction toward the mirror plate, a second rear leg extending from a front end of the bracket, adjacent the respective one of the outer actuators, along the length in direction toward the mirror plate, and a bridge extending along the width and bridging the first and second rear legs to the front leg.

22. The device of claim 21, wherein the bridge has higher flexural stiffness, in directions parallel to the plane defined by the width and the length, than each of the front leg, the first rear leg, and the second rear leg.

* * * * *